(No Model.)
C. S. BRADLEY.
PROCESS OF OBTAINING METALS FROM THEIR ORES OR COMPOUNDS.
No. 473,866. Patented Apr. 26, 1892.
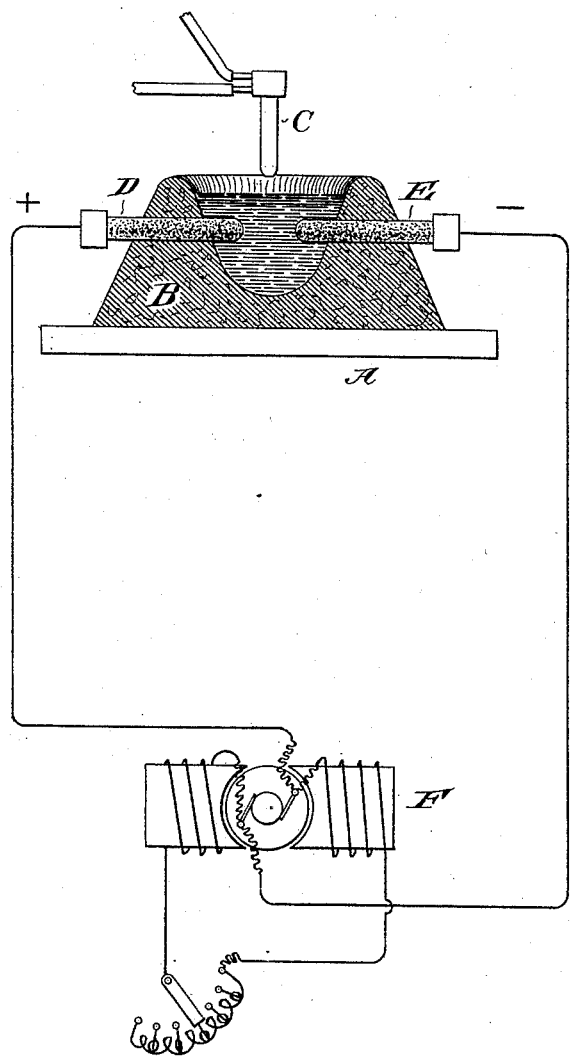

UNITED STATES PATENT OFFICE.

CHARLES S. BRADLEY, OF YONKERS, ASSIGNOR TO GROSVENOR P. LOWREY, OF NEW YORK, N. Y.

PROCESS OF OBTAINING METALS FROM THEIR ORES OR COMPOUNDS.

SPECIFICATION forming part of Letters Patent No. 473,866, dated April 26, 1892.

Original application filed February 23, 1883, Serial No. 85,957. Divided and this application filed September 16, 1889. Serial No. 324,124. (No specimens.)

*To all whom it may concern:*

Be it known that I, CHARLES S. BRADLEY, a citizen of the United States, residing at Yonkers, in the county of Westchester and State of New York, have invented certain new and useful Improvements in the Process of Obtaining Metals from their Ores or Compounds, (Divisional Case C of Serial No. 85,957;) and I do hereby declare the following to be a full, clear, and exact description of the invention, such as will enable others skilled in the art to which it appertains to make and use the same.

This specification is a division of an original application by me, Serial No. 85,957, filed February 23, 1883, and on which Letters Patent No. 468,148 were granted February 2, 1892.

The invention now described also relates to the process of effecting the reduction of minerals or other compound chemical substances while in a state of fusion by the electrolytic action of an electric current; and it is especially designed for the extraction of metals from aluminous and the like class of highly-refractory ores or compounds and their reduction to the metallic state—for example, the extraction of aluminium from one of its ores—say cryolite.

Hitherto this process has been carried on by subjecting the fused ore to the action of the current in a crucible or other refractory vessel placed in a heating-furnace where the temperature is sufficiently high to keep the ore in a melted condition; but the greatest difficulty is encountered in preventing the destruction of the crucible with this mode of working the process, for it has been found that in the case of cryolite especially, which is a double fluoride of aluminium and sodium, the fused ore unites or fluxes with the crucible itself and that the gas liberated in the process of reduction (fluorine gas) attacks the material of which the crucible is composed, and the consequence is that the crucible is quickly destroyed. This destructive fluxing action takes place to a greater or less extent in treating almost any material, and is greatly aggravated by the fact that the crucible is subjected to heat from without; but even in the case of materials which do not exert a fluxing action the mere mechanical action of the external heat is sufficient to make it almost impossible to prevent the cracking of the crucibles.

The main object of my invention is to dispense with the application of heat outside the basin or receptacle containing the mass of ore or compound under treatment. I employ an electric current to effect electrolytic decomposition, and I maintain the state of fusion by the combined heating effects of such current and a flame or like auxiliary source of heat which, like the heat due to the current, acts directly on the ore next the electrodes rather than through the walls of a furnace or crucible.

This invention therefore consists in obtaining metals from their ores or compounds by partly or wholly liquefying a mass of ore or compound with a flame projected directly thereupon and effecting the separation of the metal electrolytically by the passage of an electric current through the mass.

To enable others to carry out my process, I will proceed to describe it as applied in one particular case to the extraction of aluminium from its ore cryolite.

The accompanying drawing diagrammatically illustrates my method of operation.

Upon a hearth of brick or other suitable material A is piled a heap or body of the ore B, more or less pulverized, and a cavity or basin is excavated in the top of the heap to contain the fused portion of the ore which is to be treated electrolytically. Before starting I prefer to place the electrodes, as illustrated in the drawings at D and E, in position within the mass of ore to be treated and arrange them for connection to a suitable source of current, such as a dynamo-electric machine, as shown at F, the connection preferably being finally made by means of a suitable switch. In order to fuse the ore at the start, a suitable blowpipe C is arranged to bring heat to bear upon the ore from above until the ore has been partly or wholly fused and has become an electric conductor. When the mass has thus by the fusing action of the blowpipe assumed the state of fusion, it becomes a liquid electrolyte, and then the electric current is caused to pass from the anode to the cathode through the interposed electrolyte. The result is that in the case of cryolite aluminium is gradually deposited at the cathode and fluorine is set free at the anode.

I have spoken several times of fluorine being set free, although I am aware that it is considered to be almost impossible to isolate that element. I use the term "fluorine" merely for convenience, meaning thereby whatever is set free at the anode, which may be fluorine or some compound of fluorine with the substance composing the anode, moisture of the air, &c. As a matter of fact, when the process is worked fumes arise at the anode; but the anode is not attacked or eaten away very rapidly, provided it is made of pure carbon, such as gas-retort carbon, which I prefer to carbon containing silica or alumina.

For the purpose of perfectly managing and controlling my process I have my electric generator or source of current so arranged that the strength of the electrolytic current may be properly regulated. The most efficient way to accomplish this is to raise or lower the electro-motive power of the generator by any of the well-known methods employed, for example, in incandescent electric lighting. By these means I am enabled to dispense with the necessity of keeping the ore in a fused state by the application of heat from without through the walls of the refractory vessel; but, on the contrary, both sources of heat present—viz., the flame and the current passed through the fused ore—are concentrated just where it is needed between the two electrodes, and by the use of a vessel or cavity formed of the ore itself I avoid its destruction by the action of the melted ore and by the gas or acid set free during decomposition. The body of unfused ore may either be formed into an unconfined pile or it may be contained in a receptacle or box of any desired shape, so as practically to form a tank or holder lined with the ore itself. Such a lining will prevent the destruction of the holder, and the process may go on indefinitely without interruption.

It is obvious that other chemical and metallurgical processes may be carried on according to my invention in substantially the same manner as that I have described.

Obviously since a current cannot be passed through a conductor having resistance without generating some heat there will be in the foregoing process an incidental production of heat in the mass by the current which is caused to pass through it; but I do not herein lay claim, broadly, to the process of obtaining metals from their ores or compounds, consisting in maintaining the ore or compound in a fused or molten condition by the passage of an electric current therethrough and electrolytically decomposing said ore or compound, as such invention forms the subject-matter of my original application, Serial No. 85,957, filed February 23, 1883, of which this specification is a division. Nor do I herein lay claim to the employment of a body or heap of the ore or compound itself to constitute the vessel or cell in which the reduction takes place, as such invention forms the subject-matter of another application of even date herewith, being also a divisional application of Serial No. 85,957.

I claim as my invention—

1. The herein-described process of obtaining metals from aluminous and the like class of highly-refractory ores or compounds, which consists in fusing and, when fused, establishing an electric current through a bath of the material to be treated and by such current, together with a blowpipe-flame or other auxiliary source of heat concentrated directly upon the material treated rather than through the walls of a furnace or crucible, maintaining the fused bath of ore constant and electrolyzing the same, as set forth.

2. The herein-described process of obtaining metals from aluminous and the like class of highly-refractory ores or compounds, which consists in fusing and, when fused, establishing an electric current through a bath of the material treated, projecting a blowpipe or similar flame down upon the material in the immediate neighborhood of the electrodes, and by the combined effects of such flame and the continued passage of the electric current maintaining the fused bath of ore constant and electrolyzing it, as set forth.

In testimony whereof I affix my signature in presence of two witnesses.

CHARLES S. BRADLEY.

Witnesses:
 GEO. WORTHINGTON,
 TIMOTHY W. SPRAGUE.